United States Patent
Beiermeister

(10) Patent No.: US 7,406,321 B2
(45) Date of Patent: Jul. 29, 2008

(54) METHOD AND SYSTEM FOR PROVIDING USER-SELECTED TELEMATIC SERVICES

(75) Inventor: Frederick J. Beiermeister, Farmington Hills, MI (US)

(73) Assignee: General Motors Corporation, Detroit, MI (US)

(*) Notice: Subject to any disclaimer, the term of this patent is extended or adjusted under 35 U.S.C. 154(b) by 688 days.

(21) Appl. No.: 10/400,713

(22) Filed: Mar. 27, 2003

(65) Prior Publication Data
US 2004/0190693 A1 Sep. 30, 2004

(51) Int. Cl.
*H04Q 7/20* (2006.01)
(52) U.S. Cl. .............. 455/456.3; 340/995.13; 340/995.19; 455/345; 455/414.3; 705/26
(58) Field of Classification Search .......... 340/995.13, 340/995.19; 455/345, 414.3, 456.3; 705/26
See application file for complete search history.

(56) References Cited

U.S. PATENT DOCUMENTS

| | | | |
|---|---|---|---|
| 6,026,375 A * | 2/2000 | Hall et al. ................ 705/26 |
| 6,526,335 B1 * | 2/2003 | Treyz et al. ............... 701/1 |
| 6,535,743 B1 * | 3/2003 | Kennedy et al. ........ 455/456.1 |
| 6,856,820 B1 * | 2/2005 | Kolls ................... 455/575.9 |
| 6,912,503 B1 * | 6/2005 | Quarendon et al. .......... 705/1 |
| 6,985,753 B2 * | 1/2006 | Rodriguez et al. ...... 455/550.1 |
| 2002/0006787 A1 * | 1/2002 | Darby .................. 455/419 |
| 2002/0068549 A1 * | 6/2002 | Tendler ................. 455/414 |
| 2002/0080048 A1 * | 6/2002 | Choi .................... 340/988 |
| 2002/0116204 A1 * | 8/2002 | Willner et al. ............. 705/1 |
| 2002/0152115 A1 * | 10/2002 | Morita et al. ............ 705/13 |
| 2002/0198767 A1 * | 12/2002 | Kim ..................... 705/13 |
| 2003/0125846 A1 * | 7/2003 | Yu et al. .................. 701/1 |
| 2004/0092253 A1 * | 5/2004 | Simonds et al. ........ 455/414.2 |
| 2004/0176905 A1 * | 9/2004 | Sanqunetti et al. ........ 701/200 |

* cited by examiner

*Primary Examiner*—Fan Tsang
*Assistant Examiner*—Hemant S Patel

(57) ABSTRACT

The present invention provides a system and method for providing user-selected telematics services in a mobile vehicle. The method includes accessing a menu of available telematics services and selecting a desired telematics service. The method also includes determining a telematics service fee based on the user selected service and paying the user selected telematics service fee via remote resource. The method further includes receiving the selected telematics service.

14 Claims, 3 Drawing Sheets

METHOD AND SYSTEM FOR PROVIDING USER-SELECTED TELEMATIC SERVICES

FIELD OF THE INVENTION

This invention relates generally to telematics systems. In particular, this invention relates to a method and system for providing user-selected telematics services.

BACKGROUND OF THE INVENTION

Owners of vehicles equipped with telematics systems are continuing to voice a need for selectable services to be used on an occasional basis. For example, there are times when the vehicle owner would like to add additional non-emergency services to their base service for the purpose of getting driving directions or making hotel or restaurant reservations. These services can be especially needed in the case of rental vehicles where the user might not be familiar with his or her surroundings.

Providing these occasional services, however, can be very costly. A "pay per use" solution, for example, requires the use of special equipment that is permanently affixed inside the vehicle. This warrants equipment purchases and installation charges that increase the cost of ownership of the vehicle. Furthermore, permanently affixing the telematics equipment to the vehicle causes damage to the vehicle and therefore decreases the value of the vehicle. This equipment may also take up valuable space in the vehicle and introduce another item that has to be monitored for theft and technical maintenance.

These costs could prove to be extreme, especially in cases when the additional services might or might not be used.

It would be desirable, therefore, to provide a method for allowing user-selected telematics services that overcomes the above-mentioned limitations.

SUMMARY OF THE INVENTION

One aspect of the present invention provides a method for providing user-selected telematics services in a mobile vehicle. The method includes accessing a menu of available telematics services and selecting a desired telematics service. The method also includes determining a telematics service fee based on the user selected service and paying the user selected telematics service fee via remote resource. The method further includes receiving the selected telematics service.

Another aspect of the present invention provides a computer usable medium including a computer readable program for selecting telematics services. The program may include computer readable program code that accesses a menu of available telematics services and computer readable program code that selects a desired telematics service. It may also include a computer readable program code that determines a telematics service fee based on a user selected service and computer readable program code that pays the user selected service fee. It may also include computer readable program code that receives the telematics service.

Another aspect of the present invention provides a system for selecting telematics services. The system may include means for accessing a menu of available telematics services and means for selecting a desired telematics service. It may also include means for determining a telematics service fee based on a user selected service and means for paying the user selected telematics service fee via a remote resource. It may also include means for receiving the selected telematics service.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
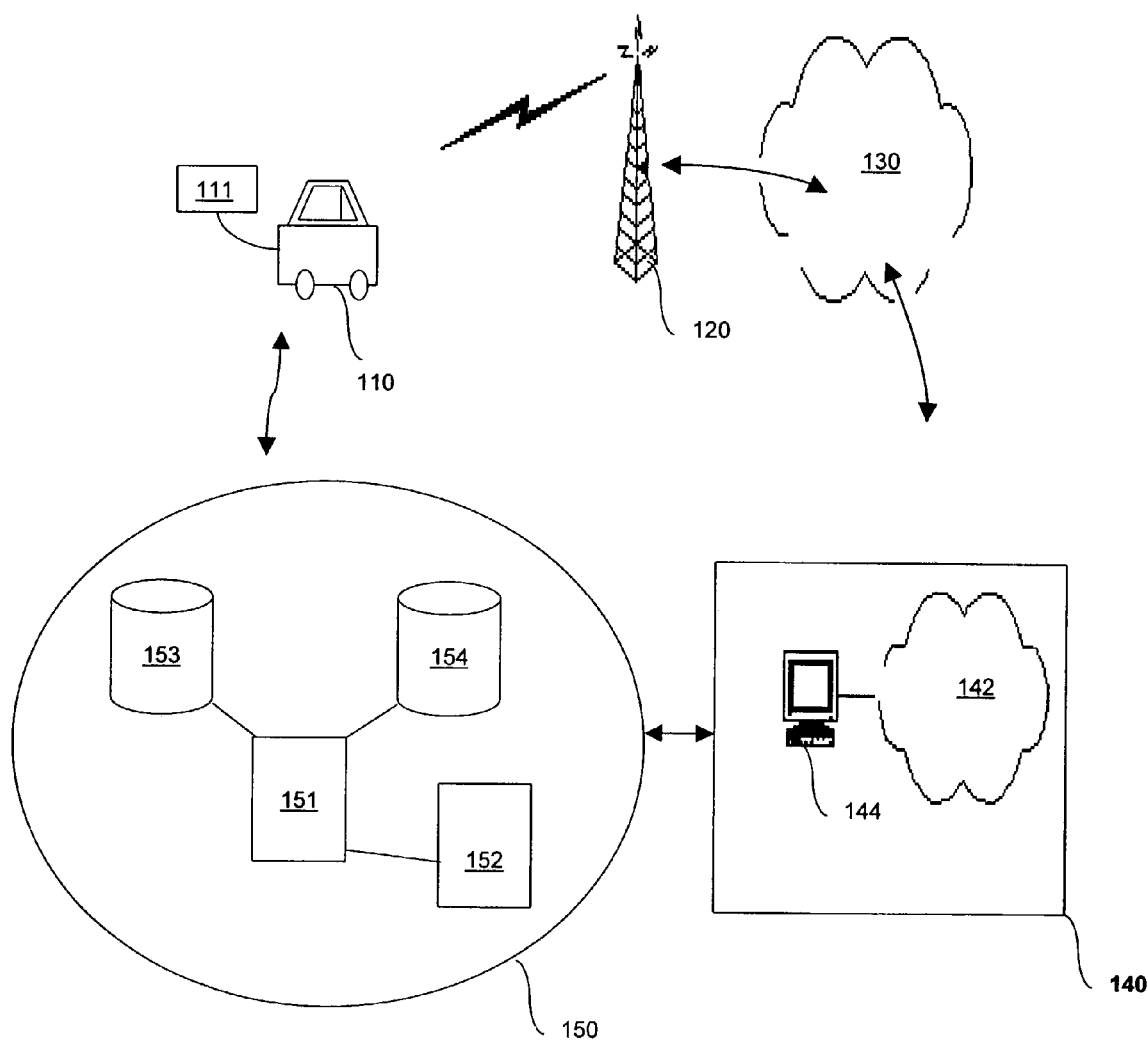
FIG. 1 is a schematic diagram of a system for providing user-selected telematics services in a mobile vehicle in accordance with the present invention.

FIG. 1 shows one embodiment of a system for providing user-selected telematics services in a mobile vehicle in accordance with the present invention at 100. The system may include one or more vehicle clients 110, one or more carrier systems 120, one or more communication networks 130, one or more service management subsystems 140, and one or more navigation subsystems 150. The service management subsystems may include one or more service management applications 142 and one or more service managers 144. The navigation subsystem 150 may include one or more route generation applications 151, 152 and one or more coordinate databases 153, 154.

Navigation subsystem 150 may be a system for generating routes to be delivered to vehicle client 110 and for receiving route information from vehicle client 110. Navigation subsystem 150 may be connected with or in communication with service management subsystem 140. Service management subsystem 140 may be used to manage the delivery of information to or from navigation subsystem 150 to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 110. In one embodiment of the invention, navigation subsystem 150 comprises one or more route generation applications 151, 152 and one or more coordinate databases 153, 154.

Route generation applications 151, 152 may be any suitable application for calculating maneuver lists of directions between one or more locations. For example, route generation applications 151, 152 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 151, 152 are in communication with coordinate databases 153, 154.

Route generation applications 151, 152 may generate navigation information in any suitable manner. For example, route generation applications 151, 152 may generate routes using geocoding. That is, the application 151, 152 determines a corresponding latitude and longitude based on an input navigation address. Alternatively, route generation applications 151, 152 may generate routes using reverse geocoding. That is, the application 151, 152 determines a corresponding navigation address based on input latitude and longitude coordinates.

Coordinate databases 153, 154 may be any suitable databases for storing such location coordinates as latitude and longitude of a variety of locations. These locations may be, for example, points of interest. Coordinate databases 153, 154 may also be databases of street addresses. Coordinate databases 153, 154 may also be databases of routes between points. Vehicle client 110 may be any suitable vehicle. For example, the vehicle may be an automobile or a passenger-carrying unit such as a bus or train. Alternatively, vehicle client 110 may be an occupant of the vehicle or any suitable client device contained in the vehicle. In one embodiment of the invention, vehicle client 110 is a mobile or portable device equipped to communicate with service management subsystem 140.

Vehicle client 110 may also include an in-vehicle navigator 111, which may be used to navigate vehicle client 110. For example, in-vehicle navigator 111 may be a driver. Alternatively, in-vehicle navigator 111 may be an automatic system for navigating vehicle 110.

Carrier system 120 may be any suitable system for transmitting a signal from vehicle 110 to service management subsystem 140. Carrier system 120 may also transmit a signal from service management subsystem 140 to vehicle client 110. In one embodiment of the invention, carrier system 120 may be a wireless carrier system as is well known in the art. Carrier system 120 may be, for example, a transmitter/receiver unit attached to vehicle client 110. Alternatively, carrier system 120 may be a separate transmitter/receiver carried by vehicle client 110.

Communication network 130 is any suitable system for communicating between vehicle client 110, via carrier system 120, and service management subsystem 140. In one embodiment of the invention, communication network 130 is a public switched telephone network (PSTN). Alternatively, communication network 130 may be a multiprotocol Internet or Intranet capable of transmitting voice and/or data in either analog or digital form or a combination of both. Alternatively, communication network 130 may be a hybrid communication network or virtual network.

Service management subsystem 140 is a system for managing a variety of services to be delivered to or from vehicle client 110. In one embodiment of the invention, service management subsystem 140 manages services that can be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
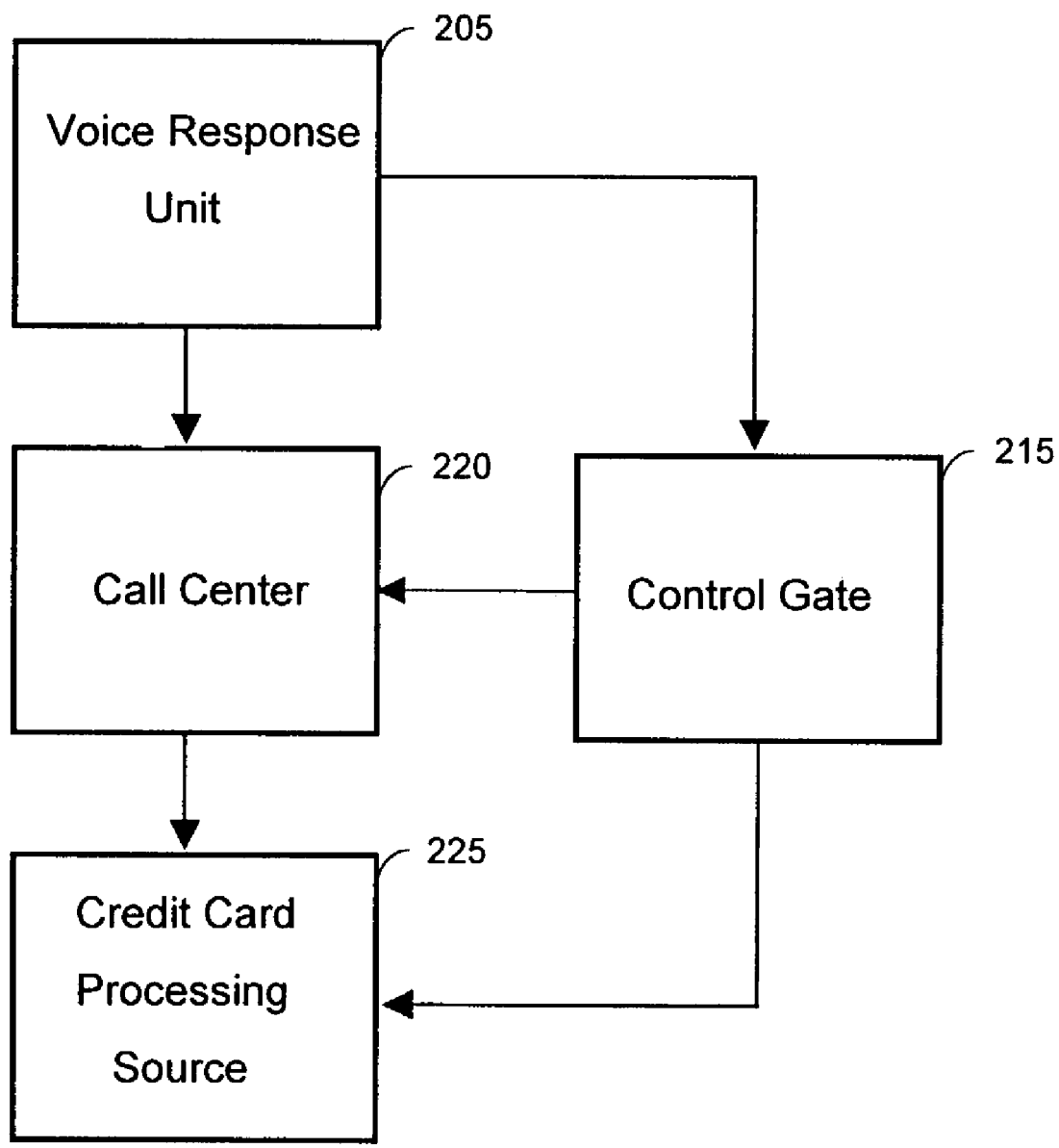
FIG. 2 is a schematic diagram, illustrating one embodiment of a method for providing user-selected telematics services in a mobile vehicle in accordance with the present invention.

Referring now to FIG. 2, one embodiment of a system for providing user-selected telematics services in a mobile vehicle, utilizing the system of FIG. 1, is shown in accordance with the present invention and generally referred to at 200.

The system 200 includes a voice response unit (VRU) 205 that provides a voice activated interface between the user and the service management subsystem 140. The voice response unit may be located inside vehicle client 110. Voice response unit 205 includes suitable hardware or software or a combination of hardware and software necessary for providing the voice activated interface between the user and the service management subsystem 140. Voice response unit 205 is also configured to play back a prewritten script stored in memory. The prewritten script may include a menu of available telematics services and their associated costs. The prewritten script may prompt the user to select from an option list consisting of making a personal call or purchasing an upgraded service. If the user decides to make a personal call or download additional minutes, the system will direct them to a call center 220. Call center 220 is part of service management subsystem 140. In one embodiment, call center 220 is an OnStar Personal Calling (OPC) Call Center. Call center 220 may be, for example, a live operator or any suitable hardware or software or combination of hardware and software that can store and download data.

The system 200 may also include credit card processing source 225. In one embodiment, the user may purchase additional minutes or make a personal call using a credit card via credit card processing source 225. In another embodiment, the user may purchase the requested service by having their vehicle information and variable cost information sent to an outside source for billing at the time of purchase. In yet another embodiment, the user may purchase the requested service by providing a vehicle identification number (VIN) that is linked to the necessary information for billing.

The system 200 may also include control gate 215. Control gate 215 includes any suitable hardware or software or combination of hardware and software for storing data. The control gate may store data, such as the vehicle identification number (VIN), GPS information, and other information relevant to the vehicle client 110.

If the user decides to purchase an upgraded service, the system will direct them to the control gate 215 to obtain stored price information regarding the upgraded services.

Once the user selects an upgraded service to purchase, the system will direct them to call center 220, where the user can obtain the service they have just purchased. Call center 220 is part of service management subsystem 140. In one embodiment, call center 220 is an OnStar Call Center. Upgraded services may include a reservations service, a navigation and directions service, or the like. Call center 220 may use navigation subsystem 150 to provide some services, such as driving directions. Call center 220 may use an outside system that uses the vehicle information and fixed cost information to invoice the customer for the upgraded service.

Figure 3:
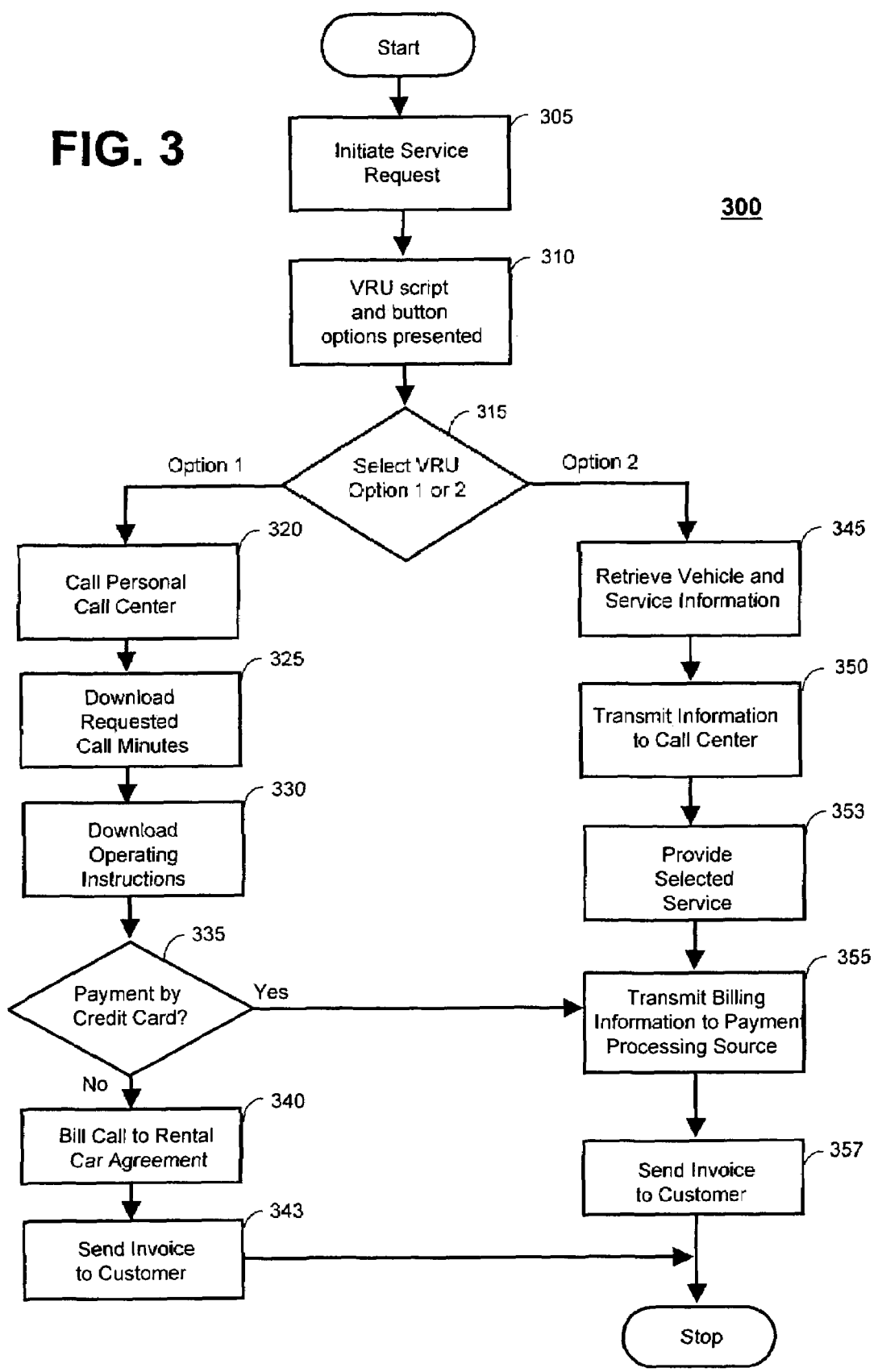
FIG. 3 shows a flow diagram of one embodiment of a method for providing user-selected telematics services in a mobile vehicle in accordance with the present invention.

Referring now to FIG. 3, one embodiment of a method for providing user-selected telematics services in a mobile vehicle, utilizing the system 200 of FIG. 2, is shown in accordance with the present invention and generally referred to at 300. Method 300 begins by initiating a service request (Block 305). The service request may be Initiated by means well known in the art, including, for example, pressing a button or the user verbally speaking the request. In one embodiment, an "OnStar Services" blue button on the OnStar panel in the client vehicle 110 may be pressed (Block 305). This button depress alerts the voice response unit (VRU) 205 that a service request sequence has been initiated. The VRU 205 then plays a preprogrammed audible script that presents options to the user (Block 310). The preprogrammed script presents a menu of available telematics services to the user. The VRU 205 preprogrammed script may then prompt the user to verbally select "option 1" to place a personal call via an automated call center system or "option 2" to purchase other selectable services, for example, driving directions (Block 315). If the user selects option 1, the VRU 205 may route the request to the OnStar Personal Call Center (Block 320) which may automatically download requested personal call minutes (Block 325) and may also download personal call operating instructions (Block 330). System 300 then determines a fee based on the user selected service. The list of fees may be retrieved from a database located at the call center 220. The user may then select to use a credit card (Block 335) as the preferred form of payment in response to VRU 205 prompts. If the user selects the appropriate response to indicate that a credit card is the preferred form of payment, the Vehicle Identification Number (VIN) and the dollar value of the downloaded personal call minutes may be transmitted to art external credit card processing source 225 (Block 355). This method links the VIN with the user's billing information for a specific credit card. This allows the customer to purchase the requested service without having to provide credit card information each time a service is requested. In another embodiment, the user may provide the credit card information at the time of each request. The user may verbally communicate the credit card information in response to prompts from the call center or, alternatively may enter the credit card number manually via a key pad.

The external credit card processing source 225 may then invoice the customer based on the credit card information provided (Block 357). Alternatively, the user may prefer not to use a credit card and opt to pay via another means. For example, in the case of renting a car, the user may prefer to have the personal phone call billed directly to the rental agreement (Block 340) and than have the customer invoiced directly at the close of the rental agreement (Block 343).

If the user selects "option 2" to purchase selectable services (Block 315), the VRU 205 may send a request to the control gate 215 to retrieve vehicle and service information (Block 345). Such information may include, for example, the vehicle identification number (VIN), Global Positioning System data, or a fixed dollar amount for the selected service. The control gate may then contact a live operator at the Call Center 220 and have the vehicle and selected service information automatically transmitted to a call center database (Block 350). The call center operator may than provide the selected service to the customer (Block 353) by accessing the requested information on the call center database server. As the control gate 215 contacts the operator at the call center 220 it may also transmit the selected service information to an external credit card processing source 225 that is known in the art. The outside payment processing source 225 may also invoice the customer at this time (Block 357).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for providing user-selected telematics services in a mobile vehicle, the method comprising:
   initiating a service request by depressing an onboard call center request button or by speaking the request, whereby an onboard voice response unit (VRU) is alerted that a service request sequence is initiated;
   playing, from the VRU in response to the alert, a preprogrammed audible script presenting a menu of available telematics services;
   selecting a desired telematics service;
   sending a request to an onboard control gate, in operative communication with the VRU, to retrieve, from the onboard control gate, vehicle-specific information and a fixed dollar amount for the selected telematics service;
   automatically transmitting, from the control gate to a call center, the vehicle-specific information and the fixed dollar amount, and a request for the selected telematics service;
   determining a telematics service fee based on the user selected telematics service;
   paying the user selected telematics service fee via a remote resource; and
   providing from the call center to the mobile vehicle, after recognition of the vehicle-specific information and the fixed dollar amount, the selected telematics service.

2. The method of claim 1, wherein selecting the desired telematics service comprises responding to at least one voice response unit prompt.

3. The method of claim 1, wherein determining the telematics service fee comprises retrieving a predetermined fee amount from a database located onboard the mobile vehicle or at a call center, the fee amount corresponding to the user selected telematics service.

4. The method of claim 1, wherein paying the service fee comprises transmitting user billing information to a payment processing source.

5. The method of claim 1, wherein paying the telematics service fee comprises:
   retrieving a vehicle identification number from the mobile vehicle; and
   transmitting the vehicle identification number and the telematics service fee to a payment processing source, wherein the vehicle identification number is linked to user billing information.

6. A computer readable medium encoded with computer executable program instructions when executed by a processor for providing user-selected telematics services in a mobile vehicle, the computer readable medium comprising:
   computer readable program code for initiating a service request in response to depression of an onboard call center request button or verbalization of the request, whereby an onboard voice response unit (VRU) is alerted that a service request sequence is initiated;
   computer readable program code for playing, from the VRU in response to the alert, a preprogrammed audible script presenting a menu of available telematics services;
   computer readable program code for selecting a desired telematics service;
   computer readable program code for sending a request to an onboard control gate, in operative communication with the VRU, to retrieve, from the onboard control gate, vehicle-specific information and a fixed dollar amount for the selected telematics service;
   computer readable program code for automatically transmitting, from the control gate to a call center, the vehicle-specific information and the fixed dollar amount, and a request for the selected telematics service;
   computer readable program code for determining a telematics service fee based on the user selected service;
   computer readable program code for paying the user selected telematics service fee via a remote resource; and
   computer readable program code for providing from the call center to the mobile vehicle, after recognition of the vehicle-specific information and the fixed dollar amount, the selected telematics service.

7. The computer readable medium of claim 6, further comprising:
- computer readable program code for retrieving a vehicle identification number from the mobile vehicle; and
- computer readable program code for transmitting the vehicle identification number and the telematics service fee to a payment processing source,
- wherein the vehicle identification number is linked to user billing information.

8. A system for providing user-selected telematics services in a mobile vehicle, the system comprising:
- means for initiating a service request, whereby an onboard voice response unit (VRU) is alerted that a service request sequence is initiated;
- means for playing, from the VRU in response to the alert, a preprogrammed audible script presenting a menu of available telematics services;
- means for selecting a desired telematics service;
- means for sending a request to an onboard control gate, in operative communication with the VRU, to retrieve, from the onboard control gate, vehicle-specific information and a fixed dollar amount for the selected telematics service;
- means for automatically transmitting, from the control gate to a call center, the vehicle-specific information and the fixed dollar amount, and a request for the selected telematics service;
- means for determining a telematics service fee based on the user selected service;
- means for paying the user selected telematics service fee via a remote resource; and
- means for providing from the call center to the mobile vehicle, after recognition of the vehicle-specific information and the fixed dollar amount, the selected telematics service.

9. The system of claim 8, further comprising:
- means for retrieving a vehicle identification number from the mobile vehicle; and
- means for transmitting the vehicle identification number and the telematics service fee to a payment processing source;
- wherein the vehicle identification number is linked to user-specific billing information.

10. The method of claim 1 wherein the vehicle-specific information includes a vehicle identification number (VIN), global positioning system (GPS) data, or combinations thereof.

11. The method of claim 1 wherein, substantially simultaneous with the automatic transmitting, the control gate transmits the vehicle-specific information and the fixed dollar amount to an external payment processing source.

12. The method of claim 3, wherein the database is located onboard the mobile vehicle.

13. The method of claim 11 wherein the vehicle-specific information is a vehicle identification number, and wherein the method further comprises associating the vehicle identification number with billing information for a specific credit card of the user.

14. The method of claim 5 wherein the user billing information is associated with a specific credit card of the user.

* * * * *